(12) United States Patent
Johnson et al.

(10) Patent No.: US 11,165,527 B2
(45) Date of Patent: Nov. 2, 2021

(54) TIME SYNCHRONIZATION FOR ENCRYPTED TRAFFIC IN A COMPUTER NETWORK

(71) Applicant: Juniper Networks, Inc., Sunnyvale, CA (US)

(72) Inventors: John D. Johnson, Los Altos, CA (US); Arthur T. Leung, Chapel Hill, NC (US); Don Mark Royals, Raleigh, NC (US); Jonathan B. Sadowsky, Chapel Hill, NC (US)

(73) Assignee: Juniper Networks, Inc., Sunnyvale, CA (US)

( * ) Notice: Subject to any disclaimer, the term of this patent is extended or adjusted under 35 U.S.C. 154(b) by 21 days.

(21) Appl. No.: 16/723,548

(22) Filed: Dec. 20, 2019

(65) Prior Publication Data

US 2021/0194612 A1 Jun. 24, 2021

(51) Int. Cl.
*H04J 3/06* (2006.01)
*H04L 12/26* (2006.01)

(52) U.S. Cl.
CPC .......... *H04J 3/0661* (2013.01); *H04J 3/0688* (2013.01); *H04L 43/0817* (2013.01); *H04L 43/0852* (2013.01); *H04L 43/106* (2013.01)

(58) Field of Classification Search
CPC ..... H04L 12/433; H04L 12/64; H04L 1/0083; H04L 12/28
See application file for complete search history.

(56) References Cited

U.S. PATENT DOCUMENTS

| | | | |
|---|---|---|---|
| 8,005,369 B2 * | 8/2011 | Ko | H04B 7/2693 398/154 |
| 9,356,721 B2 * | 5/2016 | Haulin | H04J 3/0661 |
| 10,931,391 B2 * | 2/2021 | Mallela | H04J 3/0667 |
| 2013/0114601 A1 | 5/2013 | Branscomb | |
| 2019/0097745 A1 | 3/2019 | Mallela et al. | |
| 2019/0387557 A1 * | 12/2019 | Cai | H04L 5/0005 |
| 2021/0058914 A1 * | 2/2021 | Chae | H04W 72/046 |

OTHER PUBLICATIONS

Extended Search Report from counterpart European Application No. 20162877.3, dated Sep. 21, 2020, 6 pp.

* cited by examiner

*Primary Examiner* — Chandrahas B Patel
(74) *Attorney, Agent, or Firm* — Shumaker & Sieffert, P.A.

(57) ABSTRACT

In general, various aspects of the techniques described in this disclosure provide time synchronization for encrypted traffic in a computer network. In one example, the disclosure describes an apparatus, such as a network device, having a control unit for a network device in a computerized network having a topology of network devices; and a forwarding unit operative to determine a release time for sending a synchronization packet in accordance with a time synchronization protocol; modify the synchronization packet to include a release timestamp specifying the release time; sending a time value via sideband data associated with the synchronization packet, wherein the time value is based on the release time specified by the release timestamp; and schedule transmission of the synchronization packet for a time corresponding to the time value in the sideband data, the synchronization packet to be transmitted to a destination network device.

20 Claims, 5 Drawing Sheets

TIME SYNCHRONIZATION FOR ENCRYPTED TRAFFIC IN A COMPUTER NETWORK

TECHNICAL FIELD

The disclosure relates to computer networks and, more particularly, to time synchronization within computer networks.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. The destination device extracts the data from the packets and assembles the data into its original form. Intermediate devices (referred to as network devices or nodes) are interconnected so as to provide an infrastructure for forwarding the packets between computing devices. For example, computer networks may include routers, switches, gateways, firewalls and a variety of other devices.

Having a correct local clock and accurate time information is important for devices in computer networks. Accuracy with respect to time information, in the technical field of computer networks, is paramount and can be defined at a very fine margin. A minuscule difference between local clocks can result in a significant amount of inaccuracies in network device functionality. For example, accurate time information (i.e., time of day) may be necessary for computing timing delays for communicating packets between networked computing devices. Accurate time information regarding the transit time of packets may be important to assess network efficiency and to ensure quality of service and performance measures. As an example, transit-delayed packets may result in interrupted audio service in voice over Internet Protocol (VoIP) applications. It is important for the current time on all the interconnected computing devices of the network to be accurately synchronized to a primary reference time. The primary reference time may be provided by a primary reference clock source device, such as a Global Positioning System (GPS).

Typically, devices in computer networks maintain a correct local clock by way of a time synchronization protocol. In accordance with the time synchronization protocol, a master network device determines the primary reference time and provides other network devices accurate time information to correct their local clocks. Computer networks may also implement an encryption scheme to secure data being transmitted between computing devices. Encrypting time information may reduce an overall accuracy of that time information. When such information is encrypted, the encryption scheme prevents the time information from being evaluated or changed; any uncertainty in the time information remains. This is especially problematic when a variable latency in packet delivery adds more uncertainty to the time information.

Conventional solutions to variable packet latency introduce a fixed delay to account for an amount of time spent for encryption by security hardware and for communication by transmission hardware. The encryption time (in part) may be attributed to a networking security protocol (e.g., MACsec) and the communication time (in part) may be attributed to a first-in-first-out (FIFO) transmission queue. For example, MACSec may be shared across multiple ports, causing a variable latency in MACSec's pipeline. There could be a considerable number of packets awaiting transmission in the FIFO transmission queue, causing a variable delay in FIFO's pipeline. There could be a considerable number of packets in other hardware components. Unfortunately, the fixed delay routinely fails to accurately account for operations of the security hardware and/or the transmission hardware.

Hence, the variable packet latency may render inaccurate any computed estimate of the delay in encrypting the synchronization packet and then, transmitting the synchronization packet. Adjusting a local clock with such information may not sufficiently correct the local clock or may overcorrect the local clock, making that clock's time information even more inaccurate.

SUMMARY

In general, the disclosure describes various techniques enabling more accurate time synchronization for devices in a computer network. The main objective of time synchronization protocols is propagation of accurate time information amongst network devices. Having the accurate time information, a network device may correct its local clock, ensuring correctness in data transfers with other devices. Such information may include a time value indicating the time a packet is transmitted by a network device. This time value is embedded into the packet as a timestamp.

In some examples, communications sent by a sender network device may be encrypted for security purposes, including to secure the time value that is embedded in a synchronization packet. An example encryption protocol is media access security protocol (MACSec). If the synchronization packet is encrypted before the time value is embedded, the encryption scheme fails. To ensure the encryption scheme succeeds, the time value is embedded as a timestamp, and then the synchronization packet is encrypted.

The techniques described herein enable a workable application of both the encryption protocol and the time synchronization protocol. Some techniques introduce mechanisms for ensuring accuracy of the embedded time value (after being encrypted) in the synchronization packet. In some examples, sideband data is one mechanism to hold, in unencrypted form, the embedded time value or another piece of time information. The sideband data may be communicated, on a controlpath bus, to transmission hardware, instructing components in the transmission hardware to schedule transmission at a time corresponding to the time value in the sideband data.

While the embedded time value in the synchronization packet is encrypted, this information can still be read or accessed in plaintext form via the techniques described herein (e.g., via the sideband data). Because the sideband data is determined before encryption, the encryption scheme does not prevent the time information from being evaluated and/or changed. Even in situations involving a variable latency in packet delivery, the techniques describe herein provide an accurate latency estimate of an amount of time spent for encryption by security hardware and for communication by transmission hardware. In addition, by providing the transmission hardware with the time information, the techniques described herein enable the transmission hardware to further ensure accuracy of the time information. One example technique communicates, in the sideband data, a time value for releasing the synchronization packet from a FIFO transmission queue.

In one example, a method includes determining, by processing circuitry of a network device, a release time for sending a synchronization packet in accordance with a time synchronization protocol; modifying, by the processing circuitry, the synchronization packet to include a release timestamp specifying the release time; and sending, by the processing circuitry, a time value via sideband data associated with the synchronization packet, wherein the time value is based on the release time specified by the release timestamp; scheduling, by the processing circuitry, transmission of the synchronization packet for a time corresponding to the time value in the sideband data, the synchronization packet to be transmitted to a destination network device.

In another example, a computing device includes a forwarding unit comprising: an interface configured to receive packets; at least one packet processor operably coupled to a memory; an internal forwarding path, wherein at least a portion of the forwarding path is stored to the memory and is executable by the at least one packet processor, the forwarding unit including processing circuitry to execute logic operative to: determine a release time for sending a synchronization packet in accordance with a time synchronization protocol; modify the synchronization packet to include a release timestamp specifying the release time; and sending a time value via sideband data associated with the synchronization packet, wherein the time value is based on the release time specified by the release timestamp; schedule transmission of the synchronization packet for a time corresponding to the time value in the sideband data, the synchronization packet to be transmitted to a destination network device.

In another example, a computer-readable medium containing executable instructions that, when executed by processing circuitry, causes a computing device to: receive a synchronization packet in accordance with a time synchronization protocol for the network devices; determine a time value for a release timestamp in the synchronization packet; modify the synchronization packet to include the release timestamp; encrypt the synchronization packet; and send sideband data comprising a time value corresponding to the release time, the sending of the sideband data to schedule transmission of the synchronization packet for a time corresponding to the time value in the sideband data, the synchronization packet to be transmitted to a destination network device.

In this way, the techniques may provide one or more technical advantages or improvements that provide at least one practical application. Because the accurate time information requires an estimate of an expected delay through transmission hardware and until release from the sender network device, synchronization hardware at the sender network device is configured to communicate to the transmission hardware sideband data including a release time for the synchronization packet. In this manner, by instructing the transmission hardware to hold the synchronization packet until the release time, the synchronization hardware schedules transmission of the synchronization packet at a time corresponding to the release time, ensuring accuracy of the embedded timestamp information provided by the time synchronization protocols. These techniques enable time synchronization and clock correction even in computer networks having a variable packet latency.

The details of one or more examples are set forth in the accompanying drawings and the description below. Other features, objects, and advantages will be apparent from the description and drawings, and from the claims.

DETAILED DESCRIPTION

Figure 1:
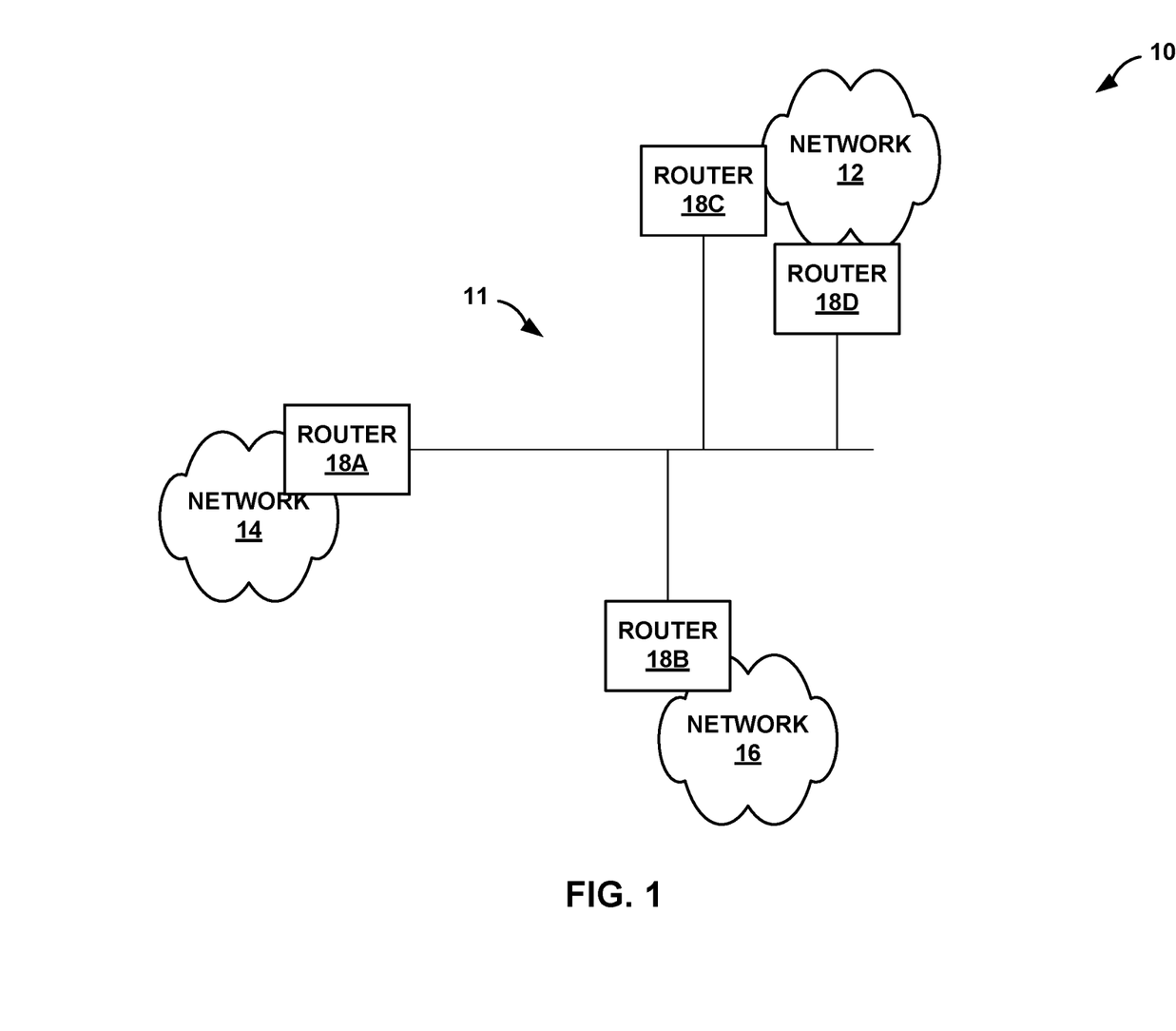
FIG. 1 is a block diagram illustrating an example system that operates in accordance with various aspects of the techniques described in this disclosure.

FIG. 1 is a block diagram illustrating an example system 10 that operates in accordance with various aspects of the techniques described in this disclosure. In the example of FIG. 1, system 10 includes a number of computer networks, such as network 12, network 14, and network 16 interconnected by routers 18A-18D ("routers 18") and Ethernet network 11. In some examples, routers 18 may be other network devices, such as switches, bridges, firewalls, or network devices having both routing and other functionality. In the example of FIG. 1, network 12 represents a shared media access network. Moreover, network 14 is communicatively coupled to network 12 by both routers 18C and 18D and, therefore, may receive traffic from network 12 via both of routers 18C and 18D.

In general, routing protocols, such as the Open Shortest Path First (OSPF) protocol, the Intermediate-System to Intermediate System (IS-IS) protocol, Routing Information Protocol (RIP), and Enhanced Interior Gateway Routing Protocol (EIGRP), allow the exchange of routing information for the purposes of identifying the topology of the example system 10.

In this example, routers 18 of system 10 implement one or more routing protocols to exchange routing information and facilitate forwarding of packets or other data units between endpoint devices throughout the network. While only network 12 is illustrated as a shared media access network, each of networks 12, 14, and 16 may comprise a shared media access network or any other type of sub-network. In general, shared access network 12 may be any form of shared access network, such as a broadcast or non-broadcast multi-access network (NBMA). As one example, shared access network 12 may include an Ethernet network 11 coupling routers 18. In other examples, an IP network may couple routers 18.

Each of routers 18 operate in accordance with a time synchronization protocol to maintain an accurate time information. For example, routers 18 may execute an IEEE 1588-based solution including clock recovery (control) algorithms, filters, and Precision Timing Protocol (PTP)-clock based on hardware timer and direct timer access. The IEEE 1588 standards define a wide range of clock synchronization operations to be used at a receiver slave network device to synchronize its local clock to a master network device. Each of routers also operate security protocols for protecting data units. Some security protocols operate a layer 3 OSI model (e.g., Internet Engineering Task Force (IETF) IP security (IPSec) standard), while some other security protocols operate above layer 3, such as Transport Layer Security (TLS) and Secure Shell (SSH)—both of which operate at the Transport layer—or below layer 3 (e.g., IEEE 802.1ae MAC security (MACSec) standard).

Packet delay variations affect performance of time synchronization operations involving local clocks of network devices. The packet delay variations inherent in packet-based networks is a primary source of clock noise. In general, packet delay variability is the main factor affecting the accuracy and stability of IEEE 1588 slave clocks. Packet network devices such as switches and routers introduce a variable delay to packets that inhibit accurate path delay measurements and clock synchronization. Even for networking mechanisms that do not require path delay measurements for clock (e.g., frequency) synchronization, packet delay variations are a direct contributor to noise in a clock. The higher the clock noise, the poorer the clock quality rendering the clock sometimes unusable for end system applications when the noise exceeds application defined thresholds. The term clock noise as described herein refers to all impairments to the timing information at the slave, including jitter, wander, and other imperfections in the clock.

For instance, the variation in delay from packet to packet through the system 10 induces noise in the slave network device's perception of the time at the master network device, affecting time synchronization in the networks 12, 14, and/or 16. Constant delay (assuming frequency synchronized clocks) would cause a fixed offset, however variable delay causes a varying estimate of the offset. The performance of the slave network device is affected by both the magnitude of this variation, and an effectiveness of the slave network device's filter at removing the clock noise.

Synchronization packets, in general, refers to a time synchronization operation involving a master network device and a slave network device. The router 18 can operate as the master network device, the slave network device, or both. The master network device has access to a clock (e.g., an atomic clock) and for the slave network device, serves as a source of accurate time information. The slave network device corrects a local clock of the slave network device using time offset information provided by the master network device based on an exchange of packets having timestamps in accordance with a time synchronization protocol, such as Precision Time Protocol (PTP) or Network Time Protocol (NTP). The synchronization packet 33A stores such time offset information as a clock offset value for use by corresponding synchronization hardware at the slave network device in correcting that slave's local clock. This timestamp purports to be an exact time that the synchronization packet is transmitted (i.e., released) from a physical layer of the master network device. This timestamp (which may be known as the release timestamp) is embedded into a data field (e.g., a header attribute) in the synchronization packet and then, encrypted to ensure security and integrity. Once encrypted, the synchronization packet, by itself, does not reveal the embedded release timestamp until decrypted by the corresponding synchronization hardware at the slave network device.

The techniques described herein introduce sideband data as a mechanism for storing a release time for a synchronization packet of the time synchronization protocol when the release time is secured within the encrypted synchronization packet as the embedded release timestamp. The release time may be transferred, in the sideband data, to transmission hardware along a different bus than the encrypted synchronization packet. The sideband data may operate as control information directing the transmission hardware to release the synchronization packet at or around a time corresponding to the transferred release time in the sideband data. In this manner, the embedded release timestamp accurately reflects an actual release time for the synchronization packet. As another advantage, the sideband data stores the release time after an encryption component of the time synchronization protocol encrypts the synchronization packet, rendering the release timestamp inaccessible.

Figure 2:
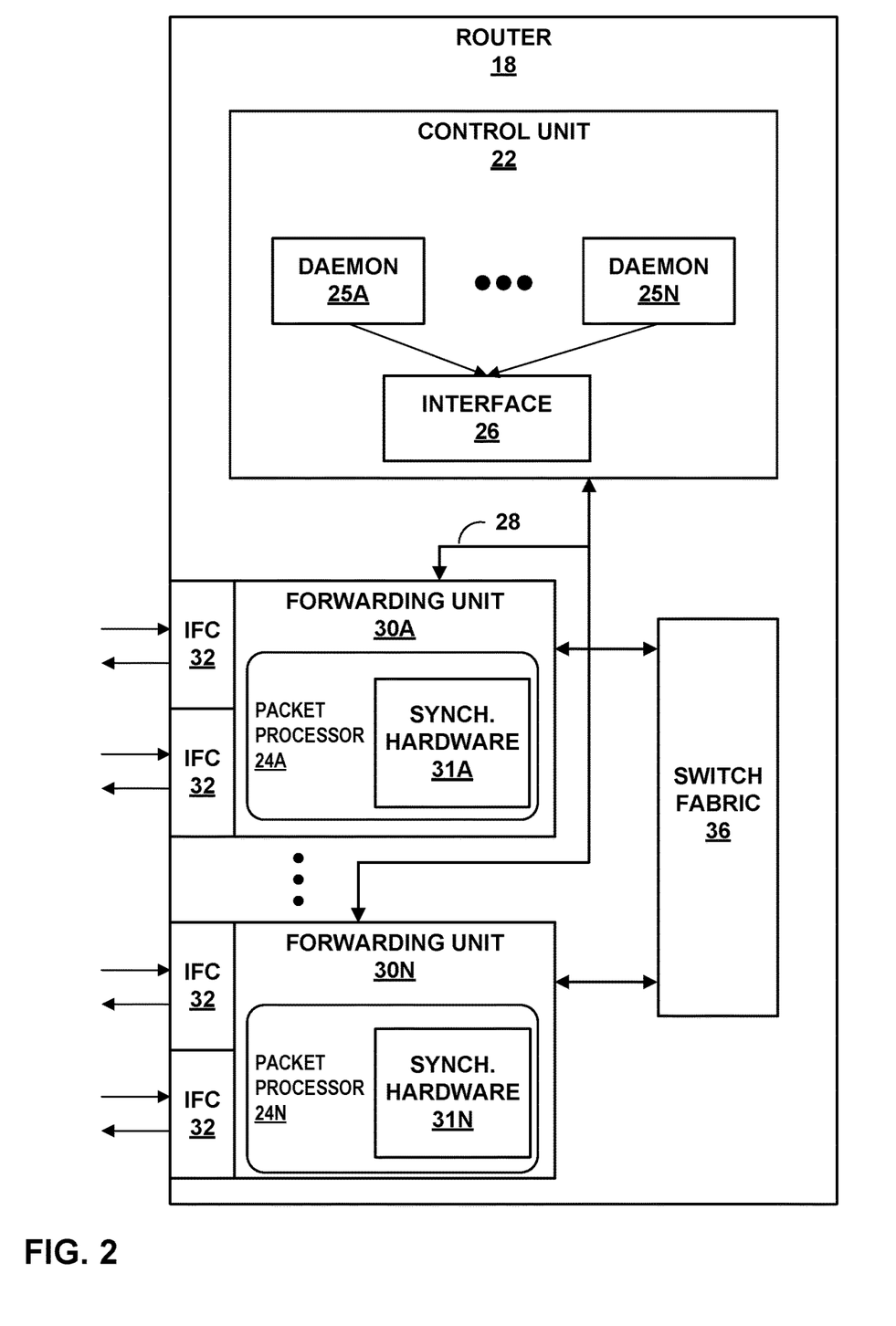
FIG. 2 is a block diagram illustrating an example network device that operates in accordance with various aspects of the techniques described in this disclosure.

FIG. 2 is a block diagram illustrating an example network device, in accordance with one or more techniques of this disclosure. The example network device may include router 18, such as a provider edge or customer edge router, or another type of network device, such as a switch. FIG. 2 depicts the router 18 of the system 10 as the example network device for explanatory purposes.

In this example, router 18 includes a control unit 22 that provides control plane functionality for the device. Control unit 22 may be distributed among multiple entities, such as one or more routing units and one or more service cards insertable into a chassis. In such instances, router 18 may therefore have multiple control planes. Router 18 also includes a plurality of forwarding units 30A-30N ("forwarding units 30") and a switch fabric 36 that together provide a forwarding plane for forwarding and otherwise processing subscriber traffic. Forwarding units 30 receive and send data packets via interfaces of interface cards 32A-32N ("IFCs 32") each associated with a respective one of forwarding units 30. Each of forwarding units 30 and its associated ones of IFCs 32 may be a separate line card for router 18 (not shown). In some examples, forwarding units 30 may be packet forwarding engines (PFEs). Example line cards include flexible programmable integrated circuit (PIC) concentrators (PFCs), dense port concentrators (DPCs), and modular port concentrators (MPCs). Each of IFCs 32 may include interfaces for various combinations of layer two (L2) technologies, including Ethernet, Gigabit Ethernet (GigE), and Synchronous Optical Networking (SONET) interfaces. In various aspects, each of forwarding units 30 may comprise more or fewer IFCs. Switch fabric 36 provides a high-speed interconnect for forwarding incoming data packets to the selected one of forwarding units 30 for output over a network.

Control unit 22 is connected to each of forwarding units 30 by internal communication link 28. Internal communication link 28 may comprise a 1 Gbps or 10 Gbps Ethernet connection, for instance. Daemons 25A-25N ("daemons 25") executed by control unit 22 are user-level processes that run network management software, execute time synchronization protocols to maintain accurate time information, execute routing protocols to communicate with peer routing devices, execute configuration commands received from an administrator, maintain and update one or more routing tables, manage subscriber flow processing, and create one or more forwarding tables for installation to forwarding units 30, among other functions.

Control unit 22 may include processing circuitry (e.g., one or more processors) that execute software instructions, such as those used to define a software or computer program, stored to a computer-readable storage medium (again, not shown in FIG. 1), such as non-transitory computer-readable mediums including a storage device (e.g., a disk drive, or an optical drive) and/or a memory such as random-access memory (RAM) (including various forms of dynamic RAM (DRAM), e.g., DDR2 SDRAM, or static RAM (SRAM)), Flash memory, another form of fixed or removable storage medium that can be used to carry or store desired program code and program data in the form of instructions or data structures and that can be accessed by a processor, or any other type of volatile or non-volatile memory that stores instructions to cause the one or more processors to perform techniques described herein. Alternatively, or in addition, control unit 22 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each forwarding unit of forwarding units 30 includes at least one packet processor 24 that processes packets by performing a series of operations on each packet over respective internal packet forwarding paths as the packets traverse the internal architecture of router 18. Packet processor 24A of forwarding unit 30A, for instance, includes one or more configurable hardware chips (e.g., a chipset) that, when configured by applications executing on control unit 22, define the operations to be performed on packets received by forwarding unit 30. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic. A single forwarding unit 30 may include one or more packet processors 24. The packet processors may be operably coupled to a memory. The packet processor may have an internal forwarding path, where at least a portion of the forwarding path is stored to the memory and is executable by the at least one packet processor.

Operations may be performed, for example, on each packet by any of a corresponding ingress interface, an ingress forwarding unit 30, an egress forwarding unit 30, an egress interface or other components of router 18 to which the packet is directed prior to egress, such as one or more service cards. Packet processors 24 process packets to identify packet properties and perform actions bound to the properties. Each of packet processors 24 includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of packet processors 24 arranges forwarding path elements as next hop data that can be chained together as a series of "hops" in a forwarding topology along an internal packet forwarding path for the network device. The result of packet processing determines the manner in which a packet is forwarded or otherwise processed by packet processors 24 of forwarding units 30 from its input interface on one of IFCs 32 to, at least in some cases, its output interface on one of IFCs 32.

In many instances, the forwarding path elements perform lookup operations, such as a tree (or trie) search, a table (or index) search, a filter determination and application, or a rate limiter determination and application. Lookup operations locate, within a lookup data structure (e.g., a lookup tree), an item that matches packet contents or another property of the packet or packet flow, such as the inbound interface of the packet.

Forwarding unit interface 26 ("FU interface 26") may comprise one or more user- or kernel-level libraries, programs, toolkits, application programming interfaces (APIs) and may communicate control and data messages to forwarding units 30 via internal communication link 28 using sockets.

For example, synchronization hardware 31 in the forwarding units 30 may execute a time synchronization operation that receives, from a master network device in accordance with a time synchronization protocol, a synchronization packet storing time information for correcting a local clock of router 18. In a complementary fashion, synchronization hardware 31 may execute a time synchronization operation that generates, for transmission to the slave network device in accordance with the time synchronization protocol, a synchronization packet storing time information for correcting that slave network device's local clock. To effectuate transmission of the synchronization packet, synchronization hardware 31 invokes functionality on transmission hardware, which may include IFC 32, to insert the synchronization packet to the packet flow and transmit the synchronization packet at release time.

In some examples, synchronization hardware 31 selects the time slot according to the embedded timestamp. The time slot may correspond to a same release time for the synchronization packet as the embedded timestamp. As an alternative, synchronization hardware 31 may adjust the time value in the embedded time stamp and use the adjusted time value as the release time for the synchronization packet. The time value may be adjusted in response to a variety of factors. To effectuate the transmission, synchronization hardware 31 directs transmission hardware in router 18 to transmit the encrypted synchronization packet to the destination network device at the selected time slot. The transmission hardware may include one or more input/output interfaces to an IFC, and in some cases, may include the IFC.

Figure 3:
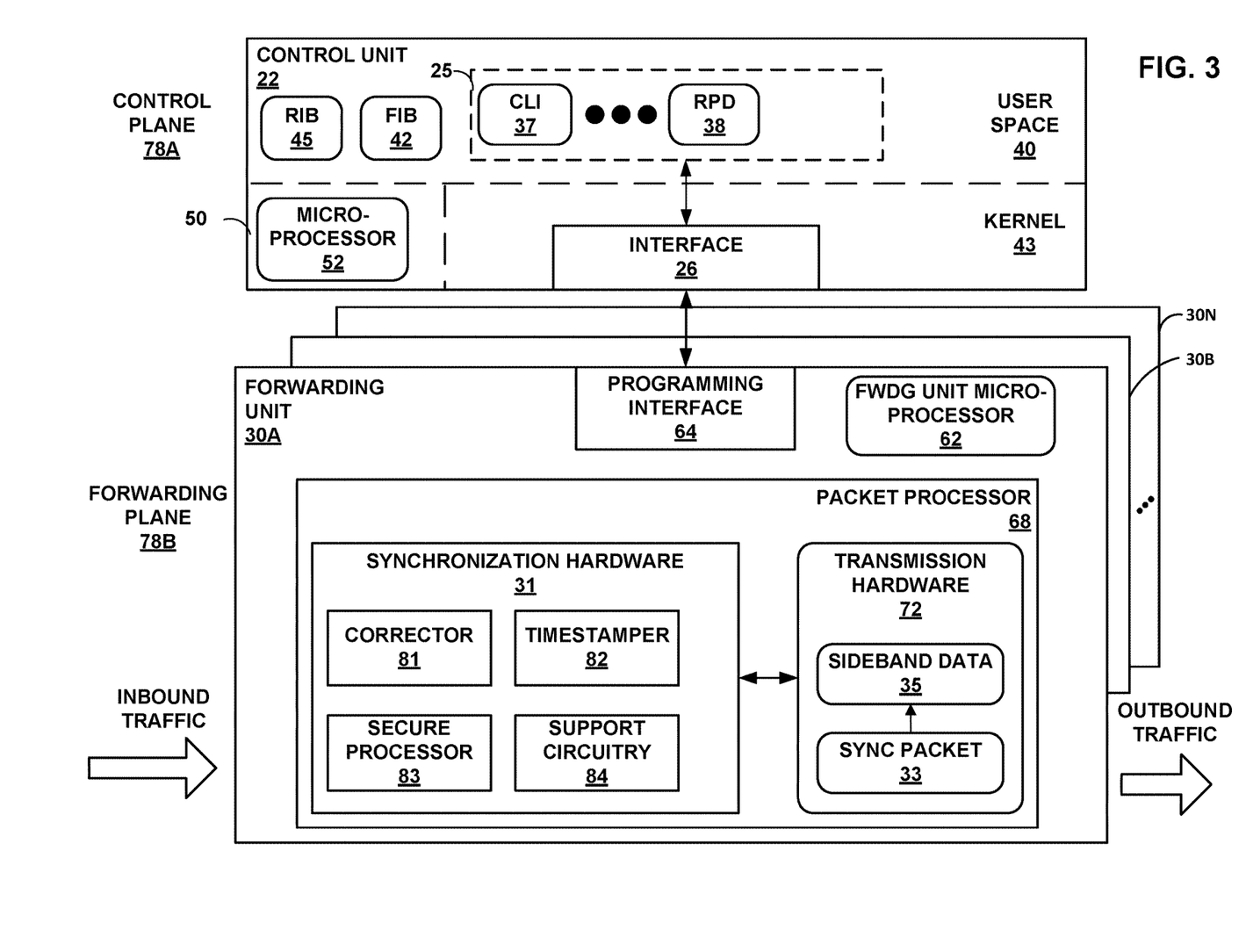
FIG. 3 is a block diagram illustrating example instances of control unit and forwarding unit of FIG. 2 in further detail.

FIG. 3 is a block diagram illustrating example instances of control unit 22 and forwarding unit 30A of forwarding units 30 of FIG. 2 in further detail. In this example, control unit 22 provides a control plane 78A operating environment for execution of various user-level daemons 25 executing in user space 40. Daemons 25 in this example include command-line interface daemon 37 ("CLI 37"), routing protocol daemon 38 ("RPD 38"), and Simple Network Management Protocol daemon 36 ("SNMP 36"). In this respect, control plane 78A may provide routing plane, service plane, and management plane functionality for router 18. Various instances of control unit 22 may include additional daemons not shown in FIG. 2 that perform other control, management, or service plane functionality and/or drive and otherwise manage forwarding plane functionality for router 18. Control unit 22 may in some instances represent a control unit of a service card or a combination of control units of a routing unit that provides routing plane functionality and a service card.

Daemons 25 operate over and interact with kernel 43, which provides a run-time operating environment for user-level processes. Kernel 43 may comprise, for example, a UNIX operating system derivative such as Linux or Berkeley Software Distribution (BSD). Kernel 43 offers libraries and drivers by which daemons 25 may interact with the underlying system. FU interface 26 of kernel 43 comprises a kernel-level library by which daemons 25 and other user-level processes or user-level libraries may interact with programming interface 64 of forwarding unit 30A. FU interface 26 may include, for example, a sockets library for communicating with forwarding unit 30A over dedicated network links.

Hardware environment 50 of control unit 22 comprises microprocessor 52 that executes program instructions loaded into a main memory (not shown in FIG. 3) from storage (also not shown in FIG. 3) in order to execute the software stack, including both kernel 43 and user space 40, of control unit 22. Microprocessor 52 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

RPD 38 executes one or more interior and/or exterior routing protocols to exchange routing information with other network devices and store received routing information in routing information base 45 ("RIB 45"). RIB 45 may include information defining a topology of a network, including one or more routing tables and/or link-state databases. RPD 38 resolves the topology defined by routing information in RIB 45 to select or determine one or more active routes through the network and then installs these routes to forwarding information base 42 ("FIB 42"). Typically, RPD 38 generates FIB 42 in the form of a radix or other lookup tree to map packet information (e.g., header information having destination information and/or a label stack) to next hops and ultimately to interface ports of interface cards associated with respective forwarding units 30.

Command line interface daemon 32 ("CLI 37") provides a shell by which an administrator or other management entity may modify the configuration of router 18 using text-based commands.

Forwarding unit 30A, in combination with other forwarding units 30 of router 18, implements forwarding plane 78B (also known as a "data plane") functionality to handle packet processing from ingress interfaces on which packets are received to egress interfaces to which packets are sent. Forwarding plane 78B determines data packet forwarding through router 18, applies services, rate limits packet flows, filters packets, and otherwise processes the packets using service objects and lookup data installed by control plane 78A to forwarding plane 78B. While FIG. 3 illustrates only forwarding unit 30A in detail, each of forwarding units 30 of router 18 comprises similar modules that perform substantially similar functionality.

Forwarding unit 30A may include processing circuitry. Processing circuitry may, in some cases, be separate from FC micro-processor 62. Processing circuitry that executes software instructions, such as those used to define a software or computer program, stored to a computer-readable storage medium, such as non-transitory computer-readable mediums including a storage device (e.g., a disk drive, or an optical drive) and/or a memory such as RAM (including various forms of DRAM, e.g., DDR2 SDRAM, or SRAM), Flash memory, another form of fixed or removable storage medium that can be used to carry or store desired program code and program data in the form of instructions or data structures and that can be accessed by a processor, or any other type of volatile or non-volatile memory that stores instructions to cause processing circuitry 88 to perform techniques described herein. Alternatively, or in addition, forwarding unit 30A may include dedicated hardware, such as one or more integrated circuits, one or more ASICs, one or more ASSPs, one or more FPGAs, or any combination of one or more of the foregoing examples of dedicated hardware, for performing the techniques described herein.

Forwarding unit 30A includes packet processors 68 (e.g., ASICs) that execute processing path 72 in accordance with techniques described herein. Forwarding unit 30A also stores additional illustrated data structures in computer-readable storage media, such as internal or external SRAM.

FU microprocessor 62 manages packet processors 68 and executes programming interface 64 to provide an interface for/to control unit 22. FU microprocessor 62 may execute a microkernel to provide an operating environment for interfaces. Programming interface 64 receives messages from control unit 22 directing forwarding unit 30A to configure portions of synchronization hardware 31.

Daemons 25 via FU interface 26 may direct programming interface 64 to operate synchronization hardware 31 of ASICS 68. The synchronization hardware 31 includes processing circuitry in various hardware/software components that are configured to exchange data with other hardware/software component, such as transmission hardware 72. The synchronization hardware 31 includes a corrector 81, a timestamper 82, a secure processor 83, and support circuitry 84. The transmission hardware 72 generally includes processing circuitry operative to receive or send synchronization packet 33 from or to network devices in the system 10. Synchronization hardware 31 provides transmission hardware 72 with a release time in sideband data 35, operating as an instruction for transmission hardware 72 to hold synchronization packet 33 (e.g., in a transmission queue). When the release time is equal to a current time, transmission hardware 72 release the hold and transmits synchronization packet 33.

Synchronization packets, as described herein, refer to a clock synchronization operation involving a master network device and a slave network device. The synchronization packet 33 stores, in an embedded timestamp, a clock offset value for use by the slave network device in correcting that slave's local clock. This timestamp purports to be an exact time that the synchronization packet is transmitted (i.e., released) from a physical layer of the master network device. This timestamp (which may be known as the release timestamp) is embedded into a data field in the synchronization packet and then, encrypted to ensure security and integrity. Once encrypted, the synchronization packet, by itself, does not reveal the embedded release timestamp until decrypted by the slave network device.

To improve the accuracy of that time information, synchronization hardware 31 described herein provides sideband data 35 storing additional information, such as a time value, for encrypting and transmitting the synchronization packet 33 (i.e., a release time). In some examples, the synchronization hardware 31 utilizes a controlpath bus to various transmission hardware (e.g., IFC 32) to communicate the selected release time as sideband data 35. In general, sideband data 35 refers to any data that is related to the synchronization packet 33 and transmitted along with a different bus. In addition to the selected release time, the sideband data may include additional metadata for the synchronization packet 33, such as end of packet and start of packet markers.

In some examples, corrector 81 of synchronization hardware 31 computes a time value for the proper release time that is based upon various network measurements. In some examples, the time value represents an expected delay for transmitting the synchronization packet. The expected delay may indicate an expected amount of time for the synchronization packet in the forwarding plane 78A prior to transmission, including any time stored in a transmission queue of transmission hardware 72.

Timestamper 82 of synchronization hardware 31 embeds the time value into the synchronization packet as a timestamp (i.e., a release timestamp) and then, secure processor 83 encrypts the synchronization packet 33, preventing the time value in the embedded timestamp from being read. In some examples, timestamper 82 truncates the time value for the release timestamp, creating a truncated time value, and then, inserts the truncated time value into the sideband data. The truncated time value may be truncated from 4 bytes to 2 bytes. In some examples, the time value for the release timestamp is truncated to something that is larger than a largest expected on-chip queueing delay. In some examples, timestamper 82 does not truncate the time value. In other examples, timestamper 82 compresses or otherwise modifies the time value to be sent by the sideband data in some other way.

In some examples, the release timestamp that is embedded into the encrypted synchronization packet may require additional adjustments based on a current hardware state; corrector 81 of synchronization hardware 31 may adjust the time value in the embedded release timestamp, generating an adjusted time value, and establish that adjusted time value as the proper release time provided in sideband data 35. The proper release time may be adjusted by other processors in the packet processors 68 or other components in the forwarding plane 78A.

Secure processor 83 may execute a media access control security protocol (e.g., MACsec protocol), which enables devices on point-to-point or shared Ethernet networks to provide, confidentiality, integrity, and authenticity for transmitted data including synchronization packets. MACsec generally supports and facilitates maintenance of correct network connectivity and services.

Synchronization hardware 31 communicates, to transmission hardware 72, the encrypted synchronization packet with the embedded timestamp and the time value to release the encrypted synchronization packet (i.e., the release time). In some examples, the release time differs from a time value in the embedded timestamp. Synchronization hardware 31 may communicate the release time as sideband data to the encrypted synchronization packet. The transmission hardware may include a transmission queue for a network interface card (IFC). Synchronization hardware 31 inserts the encrypted synchronization packet into the transmission queue and instructs transmission hardware 72 to transmit the encrypted synchronization packet at the release time. To prepare for such transmission, transmission hardware 72 communicates existing packets in the transmission queue to their destination devices while preventing new packets from entering the transmission queue, leaving a near-empty or completely empty transmission queue. Transmission hardware 72 holds the encrypted synchronization packet into the transmission queue until the release time is equal to a current time (of day).

Figure 4:
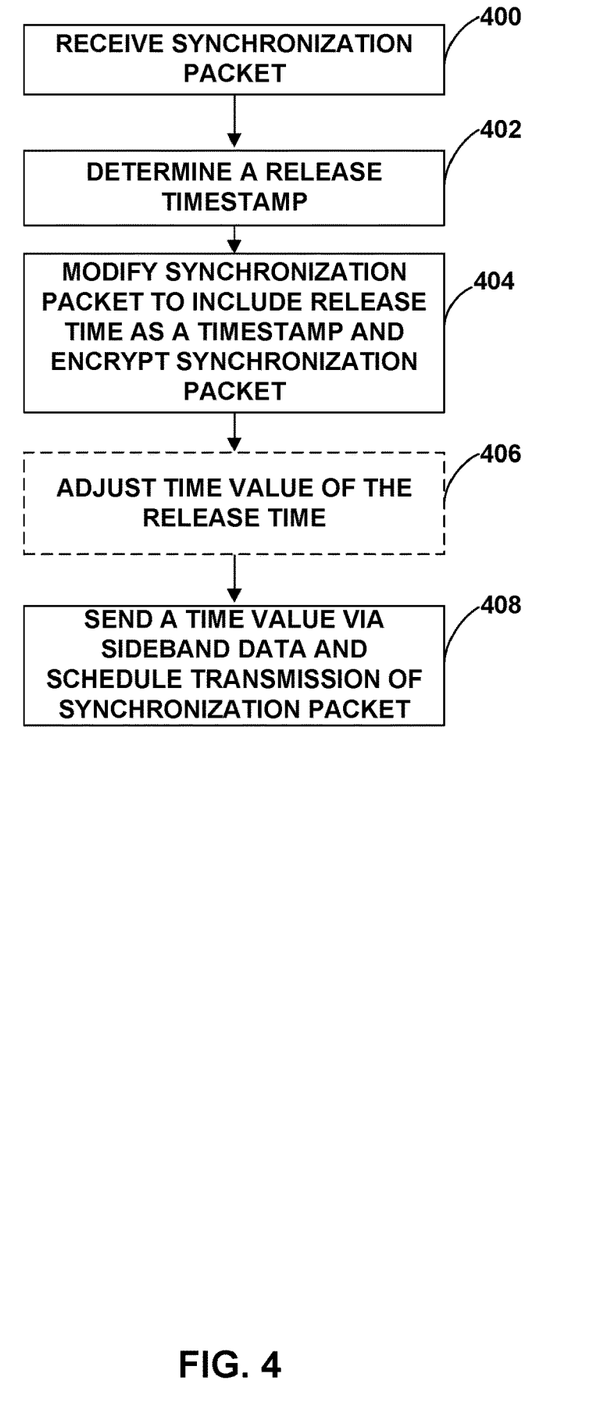
FIG. 4 is a flowchart illustrating an example operation of synchronization hardware in accordance with techniques described in the present disclosure.

FIG. 4 is a flowchart illustrating an example operation of synchronization hardware 31 in accordance with techniques described in the present disclosure. For convenience, FIG. 4 is described with respect to FIGS. 1, 2, and 3. In FIG. 4, the example operation is a clock synchronization operation providing accurate timestamps for synchronization hardware 31 when preparing synchronization packets for transmission from router 18 to a destination network device. Synchronization hardware 31 provides the synchronization packet to a transmission hardware in the forwarding plane; in addition, synchronization hardware 31 provides sideband data, such as a release time, instructing the transmission hardware as to which time to schedule communication of the synchronization packet to a destination network device.

Processing circuitry within synchronization hardware 31 receives a synchronization packet (400), for example, by accessing the synchronization packet from a memory buffer at the forwarding plane 78B. The processing circuitry within synchronization hardware 31 determines a release time for the synchronization packet (402). In some examples, synchronization hardware 31 determines the release time by computing an expected delay in encrypting and transmitting the synchronization packet. The expected delay may be computed based upon a number of bytes in various points in a pipeline of synchronization hardware 31. Using a lookup table storing mappings between byte counts and expected delays, synchronization hardware 31 identifies a mapping between the current number of bytes in the pipeline and the expected delay for the synchronization packet. As described herein, the expected delay refers to an amount of time spent in synchronization hardware 31 prior to transmission.

The release time may be used as both a timestamp embedded in the synchronization packet and as a portion of sideband data to the synchronization packet. The term "sideband data" refers to control information or metadata for the synchronization packet. In addition to the release time, the sideband data may include a start of packet marker, end of packet marker, number of valid bytes, and/or the like. The processing circuitry within synchronization hardware 31 expands a controlpath bus to also include the release time and a control signal (e.g., a marker bit) which identifies this packet as being an encrypted timestamp packet.

The processing circuitry within synchronization hardware 31 modifies the synchronization packet to include the release time as a timestamp and encrypts the synchronization packet (404). As described herein, a time value for the release timestamp is determined by computing an expected delay in transmitting the synchronization packet through transmission hardware (e.g., an IFC) in the forwarding plane 78B. This expected delay is combined with (e.g., added to) a current time of day to compute the time value for the release timestamp, which is embedded into the synchronization packet. The release timestamp is utilized by the transmission hardware to schedule a more accurate time for communicating the synchronization packet to a destination network device.

Components of synchronization hardware 31 process sideband data in different ways. A timestamper component may generate data attributes for the sideband data and then, transmit these data attributes along the controlpath bus alongside the synchronization packet in a datapath bus. A core processor component of synchronization hardware 31 may add a hold bit to these data attributes, instructing any transmission hardware to hold release of the encrypted synchronization packet.

As an option, processing circuitry within synchronization hardware 31 adjusts a time value of the release timestamp into an adjusted time value (406) to adjust for delays that may occur after the synchronization packet is released. In some examples, in response to a release time computed for the previous synchronization packet, the processing circuitry within synchronization hardware 31 may adjust the time value of the release timestamp in the (current) synchronization packet. A number of factors can be used to adjust the time value of the release timestamp into a more accurate release time for the synchronization packet. One example factor may be an accuracy of a release timestamp for the previous synchronization packet that was transmitted from transmission hardware 72.

The processing circuitry within synchronization hardware 31 sends the sideband data (e.g., to the transmission hardware) and schedules transmission of the synchronization packet (408). In some examples, the transmission hardware schedules the transmission at a time corresponding to the release timestamp or the above-mentioned adjusted time value, for example, by inserting the synchronization packet into a FIFO transmission queue at a position corresponding to the scheduled time. In other examples, the release time instructs the transmission hardware as to when to release a hold placed on a transmission queue, effectively delaying transmission until a current time is equal to a time value in the release timestamp or the above-mentioned adjusted time value.

Figure 5:
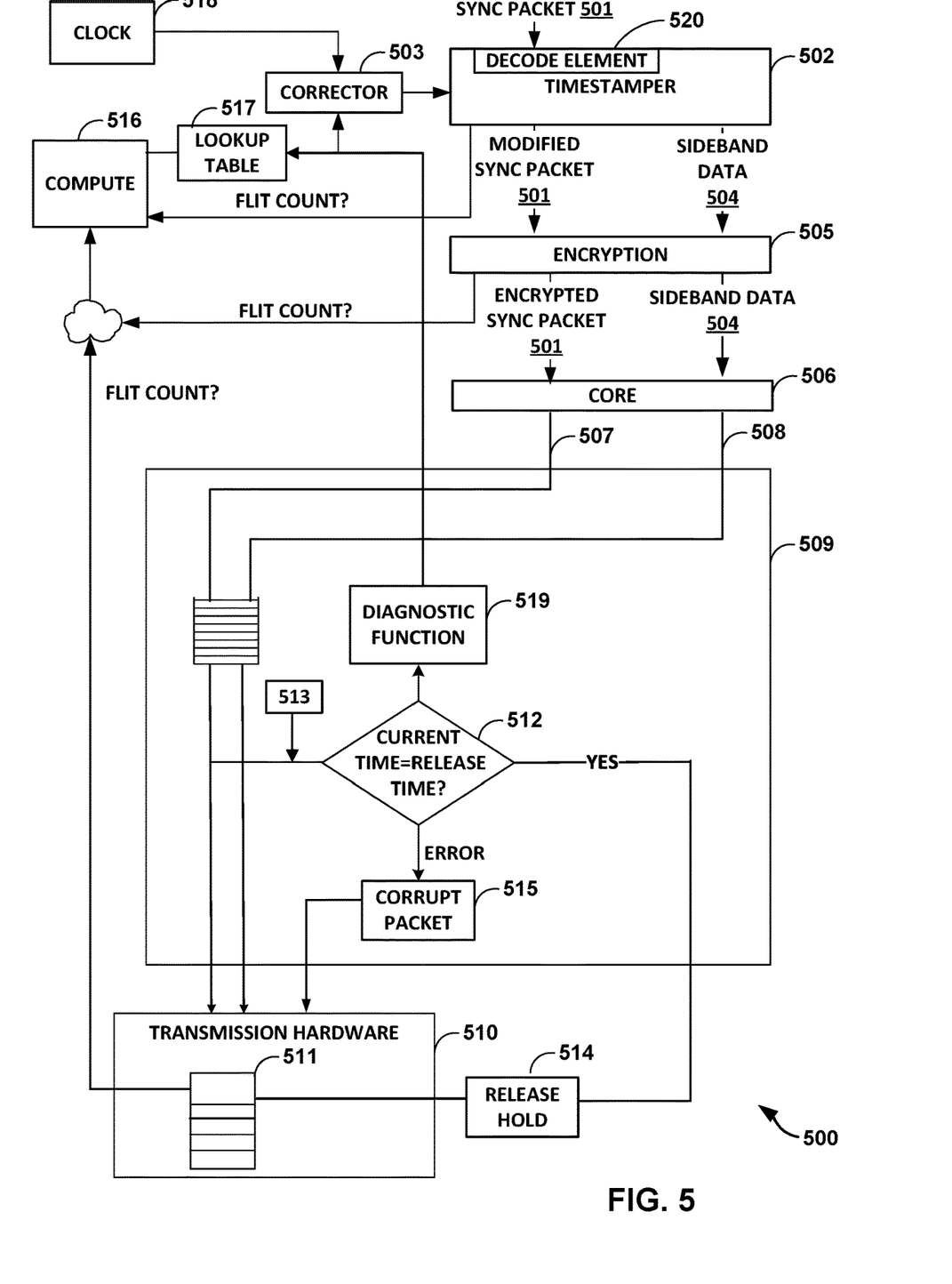
FIG. 5 is a functional block diagram illustrating an example operation of synchronization hardware in accordance with techniques described in the present disclosure.

FIG. 5 is a functional block diagram illustrating synchronization hardware 31 of router 18. In particular, FIG. 5 depicts various components involved in the example operation 500. At least some of the various components form synchronization hardware 31, such as a combination of timestamper 502, corrector 503, encryption component 505, core processor 506, and support circuitry 509. The various components also include components of transmission hardware 510 such as transmission queue 511. In general, encryption component 505 performs encryption operations on structured data to secure that structured data from access and, via core processor 506, utilizes support circuitry 509 to prepare data for transmission by transmission hardware 510. Transmission hardware 510 includes at least one IFC providing transmission queue 511.

Synchronization hardware 31 commences the example operation 500 in response to receiving, at timestamper 502, synchronization packet 501, in accordance with a time synchronization protocol. Timestamper 502 includes a prepended instruction header (i.e., metadata) decode element 520 that may recognize, amongst other packets in a packet flow, synchronization packet 501. The prepended instruction header decode element may set a marker bit in sideband data 504 in response to recognizing synchronization packet 501, e.g., for packet flows that will be encrypted.

Corrector 503 proceeds to compute an expected delay in preparing (e.g., modifying), encrypting, and transmitting the synchronization packet 501. Timestamper 502 processes the expected delay and determines a time value to insert into the synchronization packet 501 as a release timestamp, creating a modified synchronization packet 501. Timestamper 502 communicates modified synchronization packet 501 and sideband data 504 to encryption component 505. Sideband data 504 includes the hold bit followed by a time value for transmitting synchronization packet 501 from a physical layer. Setting the hold bit indicates a presence of the time value in the sideband data 504 and that the synchronization packet 501 is to be held until the time value is equal to a current time. In some examples, timestamper 502 inserts the above-mentioned determined time value into sideband data 504 as a time for transmission hardware 72 to release a hold placed on modified synchronization packet 501.

In turn, encryption component 505 encrypts the modified synchronization packet 501, securing the time value in the embedded release timestamp while maintaining, in plaintext, the time value in the release time. Encryption component 505, by encrypting the modified synchronization packet 501, creates encrypted synchronization packet 501. Encryption component 505 proceeds to communicate encrypted synchronization packet 501 and the release time to core processor 506, which initiates transmission of the encrypted synchronization packet 501 to the destination network device at the release time. In some examples, the core processor 506 communicates, along datapath bus 507, encrypted synchronization packet 501 to support circuitry 509. The core processor 506 communicates, along controlpath bus 508, the time value to support circuitry 509. Support circuitry 509 provides processing support to encryption component 505 while encrypted synchronization packet 501 is in a FIFO queue. As described herein, by communicating, along controlpath bus 508, sideband data 504 storing the release time in unencrypted form, core processor 506 is instructing the transmission hardware 31 as to what exact time to release the encrypted synchronization packet 501 from the transmission queue 511.

Support circuitry 509 performs comparison 512 between current time 513 and the release time for each encrypted synchronization packet marked with the marker bit. If the current time of day is less than the release time, support circuitry 509 places a hold and delays transmission (if needed) of the encrypted synchronization packet 501. When current time 513 is equal to release time, the support circuitry 509 orders release hold 514, instructing the transmission hardware 510 to release the encryption packet 501 from transmission queue 511. If, on the other hand, there is an error or the release time is greater than current time, the support circuitry 509 may, as an option, instruct transmission hardware 510 to corrupt packet 501, either dropping encrypted synchronization packet 501 from transmission queue 511 or transmitting encrypted synchronization packet 501 with a Cyclic Redundancy Check (CRC) Error. In response to receiving corrupted synchronization packet 501 and identifying the CRC Error, the destination network device drops that corrupted synchronization packet 501.

In some examples, encrypted synchronization packet 501 arrives at support circuitry 509 on the datapath bus 507, support circuitry 509 identifies, in data transmitted on the controlpath bus 508, an attribute that is one (1) bit in size and given attribute name marker bit. The marker bit indicates a presence of a release time in the sideband data 504 transmitted on the controlpath bus 508. Due to the assertion of this marker bit, the support circuitry 509 captures the release time in the controlpath bus 508 and executes logic in comparison 512 to compare the release time against current time 513. When the sideband data 504 is read by transmission hardware 510, the marker bit is decoded into a hold bit instruction. Setting the hold bit instructs the transmission hardware 510 to hold encrypted synchronization packet 501 until the current time is equal to the release time. Meanwhile, the transmission queue 511 fills up with packets, and the transmission hardware 510 prevents new packets from starting and drains all previous packets from the transmission queue 511. When the current time 514 is equal to the release time, the hold is released and the encrypted synchronization packet 501 begins transmission.

As described herein, timestamper 502 generates release time 504 based upon a time value in the embedded release timestamp. Additional logic on the synchronization hardware 31 computes the time value in the embedded release timestamp based upon an expected delay computation. In some examples, compute logic 516 of the synchronization hardware 31 processes flit count inputs from other components in synchronization hardware 31 and performs a lookup operation, via lookup table 517, to identify an amount of time to add, as a delay to, a time of day provided by clock 518. In general, a flit count refers to a number of bytes in a pipeline (e.g., a MACSec pipeline and a FIFO pipeline) and the flit count of a component is a count of the number of bytes moving through the pipeline in that component. Combining the flit counts generates an estimated amount of time for moving the synchronization packet 501 from the timestamper 502 to the transmission queue 511. For example, based on the number of bytes in a MAC pipeline, timestamper 502 can determine how long a packet must be held for the number of packets in the MAC pipeline to be zero, such that there can be no packets in the MAC pipeline at the time the packet is released. By tracking the flit count, the lookup table 517 can serve as a model for the variable latency in packet transmissions. Corrector 503 includes logic (e.g., an addition node) to add the above-mentioned amount of time to the time of day by clock 518 to produce the embedded release timestamp and the release time.

As an alternative to using the above-mentioned time value as both the embedded release timestamp and the release time, the timestamper 502 may adjust the time value for the release time after inserting the embedded release timestamp into the synchronization packet 501 such that the timestamper 502 communicates the adjusted time value as the release time along with modified synchronization packet 501. As a result, transmission hardware 510 releases the synchronization packet 501 at the adjusted release time value. In response to the transmission of the synchronization packet, both the time value in the embedded release timestamp and the adjusted release time value can be used in adjusting the expected delay computation for a next synchronization packet.

In some examples, synchronization hardware 31 includes logic for implementing one or more diagnostic functions. In one example, when encrypted synchronization packet 501 is inserted into the transmission queue 511 and current time 513 is compared against the release time at comparison 512, diagnostic function 519 computes a time difference between current time 513 and the release time. This time difference may be referred to as a hold time. Diagnostic function 519 may leverage such a measurement to capture observed min and max values for the hold time. Diagnostic function 519 may continuously update the observed min and max values for each subsequent encrypted synchronization packet. Corrector 503 may read these min/max delay values on the controlpath bus 508 during testing/calibration and, based upon these values, update/recalibrate mappings in lookup table 517 between flit counts and expected delays (e.g., queuing delays) in packet delivery.

Various examples have been described. These and other examples are within the scope of the following claims.

The invention claimed is:

1. A method comprising:
 determining, by processing circuitry of a network device, a release time for sending a synchronization packet in accordance with a time synchronization protocol;
 modifying, by the processing circuitry, the synchronization packet to include a release timestamp specifying the release time;
 sending, by the processing circuitry, a time value via sideband data associated with the synchronization packet, wherein the time value is based on the release time specified by the release timestamp; and
 scheduling, by the processing circuitry, transmission of the synchronization packet for a time corresponding to the time value in the sideband data, the synchronization packet to be transmitted to a destination network device.

2. The method of claim 1, further comprising inserting, by the processing circuitry, the synchronization packet into a transmission queue at the time corresponding to the time value in the sideband data.

3. The method of claim 1, wherein determining the release time comprises determining the release time based on a number of bytes in a pipeline of synchronization hardware.

4. The method of claim 1, further comprising setting, by the processing circuitry, a marker bit in the sideband data, the marker bit indicating a presence of the time value in the sideband data.

5. The method of claim 1, further comprising:
 computing, by the processing circuitry, an expected delay for the synchronization packet in synchronization hardware;
 wherein determining the release time for the release timestamp comprises determining, by the processing circuitry and based on a current time and the expected delay, the release time for the release timestamp.

6. The method of claim 1, further comprising:
 encrypting, by the processing circuitry, the release time in the synchronization packet.

7. The method of claim 6, further comprising sending, by the processing circuitry, the sideband data to transmission hardware and instructing the transmission hardware to release the synchronization packet at the time value in the sideband data.

8. The method of claim 1 wherein determining the release time comprises access a lookup table modeling an expected delay based upon a number of bytes in a pipeline in synchronization hardware.

9. The method of claim 1, further comprising adjusting, by the processing circuitry, a time value of the release timestamp.

10. The method of claim 1, further comprising preventing, by the processing circuitry, transmission of at least one of the synchronization packet or another packet based upon a comparison between a time value in the sideband data and a current time.

11. A computing device comprising:
 a forwarding unit comprising:
  an interface configured to receive packets;
  at least one packet processor operably coupled to a memory; and
  an internal forwarding path, wherein at least a portion of the forwarding path is stored to the memory and is executable by the at least one packet processor, the forwarding unit comprising processing circuitry to execute logic operative to:
   determine a release time for sending a synchronization packet in accordance with a time synchronization protocol;
   modify the synchronization packet to include a release timestamp specifying the release time;
   sending a time value via sideband data associated with the synchronization packet, wherein the time value is based on the release time specified by the release timestamp; and
   schedule transmission of the synchronization packet for a time corresponding to the time value in the sideband data, the synchronization packet to be transmitted to a destination network device.

12. The computing device of claim 11 wherein the forwarding unit further comprises processing circuitry operative to determine the release time based upon an expected delay in encrypting the synchronization packet and transmitting the synchronization packet.

13. The computing device of claim 11 wherein the forwarding unit further comprises processing circuitry operative to determine the release time based on a number of bytes in a pipeline of synchronization hardware.

14. The computing device of claim 11 wherein the forwarding unit further comprises processing circuitry operative to set a hold bit in the sideband data, the hold bit operating as an instruction for the transmission hardware to hold the synchronization packet until the time value in the sideband data is equal to a current time.

15. The computing device of claim 11 wherein the forwarding unit further comprises processing circuitry operative to determine the release time comprises access a lookup table modeling an expected delay based upon a number of bytes in a pipeline in synchronization hardware.

16. The computing device of claim 15 wherein the forwarding unit further comprises processing circuitry operative to adjust the release time for the synchronization packet in response to a release time of a previous synchronization packet.

17. The computing device of claim 15 wherein the forwarding unit further comprises processing circuitry operative to embed the release timestamp into the synchronization packet and encrypt the synchronization packet.

18. A computer-readable storage device containing executable instructions that, when executed by processing circuitry, causes a computing device to:
   receive a synchronization packet in accordance with a time synchronization protocol for the network devices;
   determine a time value for a release timestamp in the synchronization packet;
   modify the synchronization packet to include the release timestamp;
   encrypt the synchronization packet; and
   send sideband data comprising a time value corresponding to the release time, the sending of the sideband data to schedule transmission of the synchronization packet for a time corresponding to the time value in the sideband data, the synchronization packet to be transmitted to a destination network device.

19. The computer-readable storage device of claim 18 comprising executable instructions, that when executed by the processing circuitry, causes the computing device to adjust the time value that is embedded as the timestamp to obtain an adjusted time value and schedule the transmission of the encrypted synchronization packet for a time corresponding to the adjusted time value.

20. The computer-readable storage device of claim 18 comprising executable instructions, that when executed by the processing circuitry, causes the computing device to:
   communicate, to transmission hardware, the encrypted synchronization packet; and
   communicate, to the transmission hardware and after communicating the encrypted synchronization packet, the time value corresponding to the timestamp.

* * * * *